US007177904B1

(12) United States Patent
Mathur et al.

(10) Patent No.: US 7,177,904 B1
(45) Date of Patent: Feb. 13, 2007

(54) TECHNIQUES FOR SHARING CONTENT INFORMATION WITH MEMBERS OF A VIRTUAL USER GROUP IN A NETWORK ENVIRONMENT WITHOUT COMPROMISING USER PRIVACY

(75) Inventors: Rakesh Mathur, Seattle, WA (US); Ramesh Subramonian, Palo Alto, CA (US); Ramana Venkata, Mountain View, CA (US); Pangal P. Nayak, Palo Alto, CA (US); Joy A. Thomas, Sunnyvale, CA (US)

(73) Assignee: Stratify, Inc., Santa Clara, CA (US)

( * ) Notice: Subject to any disclaimer, the term of this patent is extended or adjusted under 35 U.S.C. 154(b) by 0 days.

(21) Appl. No.: 09/861,094

(22) Filed: May 17, 2001

Related U.S. Application Data

(60) Provisional application No. 60/206,190, filed on May 22, 2000, provisional application No. 60/205,938, filed on May 18, 2000.

(51) Int. Cl.
*G06F 15/16* (2006.01)
(52) U.S. Cl. ...................... 709/204; 709/206; 709/203; 709/226; 709/229
(58) Field of Classification Search ................ 709/204, 709/203, 229, 206, 226
See application file for complete search history.

(56) References Cited

U.S. PATENT DOCUMENTS

| 5,446,891 A | 8/1995 | Kaplan et al. |
| 5,717,923 A | 2/1998 | Dedrick |
| 5,727,129 A | 3/1998 | Barrett et al. |
| 5,727,159 A | 3/1998 | Kikinis |
| 5,754,939 A | 5/1998 | Herz et al. |
| 5,796,952 A | 8/1998 | Davis et al. |
| 5,815,663 A | 9/1998 | Uomini |
| 5,848,396 A | 12/1998 | Gerace |
| 5,907,677 A | 5/1999 | Glenn et al. |
| 5,933,827 A | 8/1999 | Cole et al. |
| 5,980,096 A | 11/1999 | Thalhammer-Reyero |

(Continued)

FOREIGN PATENT DOCUMENTS

GB 2335761 9/1999

OTHER PUBLICATIONS

Gnus 5.4.56 Manual, Lars Magne Ingesbrigtsen, Copyright 1995, 1996, pp. 1-54.

(Continued)

*Primary Examiner*—Ario Etienne
*Assistant Examiner*—Sahera Halim
(74) *Attorney, Agent, or Firm*—Townsend and Townsend and Crew LLP

(57) ABSTRACT

Techniques for sharing content information between members of a virtual user group without compromising the privacy of the members. A user can identify content information to be shared with other members of a virtual user group using a user computer system. The content information is then communicated to the other members of the virtual user group and can be accessed by members of the virtual user group in such a manner that the privacy of the user and of the other members of the virtual user group is not compromised. The present invention preserves user privacy by controlling and minimizing the amount of user-related information available/accessible to server systems hosting the virtual user groups.

19 Claims, 8 Drawing Sheets

U.S. PATENT DOCUMENTS

| | | | |
|---|---|---|---|
| 5,991,735 | A | 11/1999 | Gerace |
| 6,018,619 | A | 1/2000 | Allard et al. |
| 6,108,493 | A | 8/2000 | Miller et al. |
| 6,119,101 | A | 9/2000 | Peckover |
| 6,128,663 | A | 10/2000 | Thomas |
| 6,138,155 | A | 10/2000 | Davis et al. |
| 6,167,441 | A | 12/2000 | Himmel |
| 6,169,997 | B1 | 1/2001 | Papierniak et al. |
| 6,182,116 | B1 * | 1/2001 | Namma et al. ............. 709/204 |
| 6,243,761 | B1 | 6/2001 | Mogul et al. |
| 6,253,202 | B1 | 6/2001 | Gilmour |
| 6,286,043 | B1 | 9/2001 | Cuomo et al. |
| 6,310,601 | B1 | 10/2001 | Moore et al. |
| 6,327,574 | B1 | 12/2001 | Kramer et al. |
| 6,334,110 | B1 | 12/2001 | Walter et al. |
| 6,338,051 | B1 | 1/2002 | Kang et al. |
| 6,359,633 | B1 | 3/2002 | Balasubramaniam et al. |
| 6,366,913 | B1 * | 4/2002 | Fitler et al. .................... 707/9 |
| 6,377,983 | B1 | 4/2002 | Cohen et al. |
| 6,381,632 | B1 | 4/2002 | Lowell |
| 6,385,619 | B1 | 5/2002 | Eichstaedt et al. |
| 6,438,579 | B1 | 8/2002 | Hosken |
| 6,457,010 | B1 | 9/2002 | Eldering et al. |
| 6,457,026 | B1 | 9/2002 | Graham et al. |
| 6,496,931 | B1 | 12/2002 | Rajchel et al. |
| 6,546,488 | B2 * | 4/2003 | Dillon et al. ................ 713/181 |
| 6,564,233 | B1 | 5/2003 | Fleischmann |
| 6,581,072 | B1 | 6/2003 | Mathur et al. |
| 6,622,168 | B1 | 9/2003 | Datta |
| 6,654,814 | B1 | 11/2003 | Britton et al. |
| 6,658,167 | B1 | 12/2003 | Lee et al. |
| 6,671,692 | B1 * | 12/2003 | Marpe et al. ................ 707/102 |
| 6,687,691 | B1 | 2/2004 | Agrawal et al. |
| 6,701,362 | B1 | 3/2004 | Subramonian et al. |
| 6,766,355 | B2 | 7/2004 | Liang et al. |
| 2002/0129094 | A1 | 9/2002 | Reisman |
| 2003/0037324 | A1 | 2/2003 | Kong et al |
| 2003/0158897 | A1 | 8/2003 | Ben-Natan et al. |

OTHER PUBLICATIONS

USENET—A Guide to Netnews, San Diego State University, Published Jan. 27, 1997; http://www-rohan.sdu.edu/0302.html.

RFC 977; Network News Transfer Transfer Protocol; B. Kantor, P. Lapsey, Feb. 1986, p. 1-27.

Using Microsoft Outlook 98, G. Padwick, Que, Div of McMillan Computer Publishing, Copyright 1998, pp. 380-392.

Gschwind et al., "A Cache Architecture for Modernizing the Usenet Infrastructure," *Proc. 32nd Hawaii Int. Conf. System Sciences—1999*, pp. 1-9 (1999).

Ingebrigtsen, L. M., Gnus 5,4,56 Manual, 1995-1996, Free Software Foundation, Inc. http://www-rohan,sdu,edu/0302.html pp. 2-127.

Hsu et al., "Constructing personal digital library by multi-search and customized category", IEEE International Conference on Tools with Artificial Intelligance, ISBN: 0-7803-5214-9, pp. 148-155, Nov. 1998.

Ignatius "Tools for Detecting Terror", www.washingtonpost.com, p. A37, pp. 1-3, Oct. 2002.

Shahabi et al., "Knowledge discovery from users Web-page navigation", IEEE International Workshop on Research Issues in Data Engineering, ISBN: 0-8186-7849-6, pp. 20-29, Apr. 1997.

Tu et al., "Agetn Technology for website browsing and navigation", IEEE International Conference on Systems Sciences, ISBN: 0-7695-0001-3, pp. 2-11, Jan. 1999.

* cited by examiner

TECHNIQUES FOR SHARING CONTENT INFORMATION WITH MEMBERS OF A VIRTUAL USER GROUP IN A NETWORK ENVIRONMENT WITHOUT COMPROMISING USER PRIVACY

CROSS-REFERENCES TO RELATED APPLICATIONS

This application claims priority from the following applications, the entire disclosures of which are herein incorporated by reference for all purposes:

(1) U.S. Provisional Patent Application No. 60/206,190, entitled "SYSTEM AND METHOD FOR PROVIDING INFORMATION TO USERS IN A NETWORK ENVIRONMENT WITHOUT COMPROMISING USER PRIVACY" filed May 22, 2000; and (2) U.S. Provisional Patent Application No. 60/205,938, entitled "SYSTEM AND METHOD FOR CREATING VIRTUAL COMMUNITIES WHILE PRESERVING THE PRIVACY OF USERS IN THE VIRTUAL COMMUNITY" filed May 18, 2000.

The present application also incorporates herein by reference for all purposes the entire disclosures of the following applications which are filed concurrently with this application:

(1) U.S. patent application Ser. No. 09/861,463 filed May 17, 2001, entitled "TECHNIQUES FOR IDENTIFYING AND ACCESSING INFORMATION OF INTEREST TO A USER IN A NETWORK ENVIRONMENT WITHOUT COMPROMISING THE USER'S PRIVACY" (now U.S. Pat. No. 6,581,072);

(2) U.S. patent application Ser. No. 09/861,082 filed May 17, 2001, entitled "TECHNIQUES FOR IDENTIFYING VIRTUAL USER GROUPS IN A NETWORK ENVIRONMENT WITHOUT COMPROMISING USER PRIVACY"; and (3) U.S. patent application Ser. No. 09/861,471 filed May 17, 2001, entitled "TECHNIQUES FOR JOINING VIRTUAL USER GROUPS IN A NETWORK ENVIRONMENT AND RECEIVING INFORMATION RELATED TO THE VIRTUAL USER GROUPS WITHOUT COMPROMISING USER PRIVACY".

BACKGROUND OF THE INVENTION

The present invention relates to the use of communication networks such as the Internet to connect users of common interests. In particular, the present invention provides techniques for sharing content information between members of a virtual user group without compromising the privacy of the members.

With the widespread use of computers, an expanding telecommunication network, and the rising popularity of communication networks such as the Internet, an increasing amount of information is stored by computer systems coupled to the communication networks. In the World Wide Web ("Web") environment, information resources are typically stored in the form of hypertext documents called "web pages" which can be accessed and read by users of the Web. A web page may incorporate any combination of text, graphics, audio and video content, software programs, and other data. Web pages may also contain hypertext links to other web pages. Web pages are typically stored on web servers or content servers coupled to the Internet. Each web page is uniquely identified by an address called a Uniform Resource Locator (URL) that enables users to access the web page.

Computer systems connected to communication networks such as the Internet can generally be classified as "clients" or "servers" depending on the role the computer systems play with respect to requesting information or storing/providing information. Computers systems which are used by users to access information are typically called "client" computers. Users typically access web pages using a program called a "web browser" which generally executes on a client computer coupled to the Internet. The web browser is a type of client application that enables users to select, retrieve, and perceive information contained in web pages. Examples of browsers include the Internet Explorer browser program provided by Microsoft Corporation, the Netscape Navigator browser provided by Netscape Corporation, and others. Users generally access web pages by providing URL information to the browser, either directly or indirectly, and the browser responds by retrieving the web page corresponding to the user-provided URL from the Internet. The retrieved web page is then displayed to the requesting user on the client computer.

The web pages are generally stored by "server" computer systems coupled to the communication network. Server systems are responsible for receiving information requests from client systems, performing processing required to satisfy the requests, and for forwarding the results/information corresponding to the information requests back to the requesting client systems. The processing required to satisfy the client request may be performed by a single server system or may alternatively be delegated to other servers connected to the communication network, such as the Internet. It should be apparent that a particular computer system may function both as a server and a client.

Communication networks, such as the Internet, are also being widely used as tools to connect users having similar interests, hobbies, preferences, and the like. This is evidenced by the increasing number of portals, virtual communities, chat rooms, etc. related to a variety of different topics and subjects. These "virtual user communities" bring together users of similar interests for purposes of trading or discussion or simply exchange of information. For example, if a particular user is interested in "Thai Cooking," the user can become a member of a virtual user group dedicated to Thai cooking and exchange information with other user members interested in Thai cooking.

In order to participate in such virtual user groups, a user has to identify a particular virtual user group of interest to the user and then become a member (or join) of the virtual user group to be able to exchange information with other members of the virtual user groups. Due to the vast proliferation of virtual user groups, in order to identify a virtual user group of interest to the user, most users generally use search engines to help identify one or more virtual user groups from a large collection of virtual user groups hosted by computer systems coupled to the communication network. Examples of search engines in the Internet environment include search engines provided by Yahoo, Google, Lycos, Excite, Altavista, and the like.

Search engines typically use programs such as crawlers or spiders to find information about virtual user groups supported or hosted by computer systems coupled to the communication network. The information collected by a crawler may include the name of the virtual user group, the topic or subject to which the virtual user group is dedicated, information about the server system hosting the virtual user group, and other like information. The information collected by a crawler is usually stored by the server providing the search engine in the form of an index which facilitates identification of virtual user groups based on criteria related to the virtual user groups. The structure of an index may vary based on the search engine.

In order to identify virtual user groups of interest, a user generally configures a query using a client computer. The query may contain query terms which describe, for example, a topic or concept for which the user is interested in finding virtual user groups. For example, if the user is interested in finding virtual user groups related Thai cooking, the query terms may include the words "Thai" and "cooking."

The user-configured query is then communicated from the user's client computer to a remote server system executing a search engine. Upon receiving the search query, the search engine executing on the remote server identifies virtual user groups which match or satisfy the user query based upon information stored in the index used by the search engine. Information identifying the relevant virtual user groups (i.e. virtual user groups identified to satisfy the user query) is then communicated from the remote search engine server to the user's client computer. The user may then use the information received from the search engine to join one or more virtual user groups.

Some search engines also perform searches implicitly without receiving user input based on the contents of documents (e.g., web pages) viewed by the user. These search engines use the contents of the document being browsed/viewed by the user as a search query which is communicated from the user computer to the search engine server. Based on the contents of the document being viewed by the user and based upon index information being used by the search engine, the search engine identifies virtual user groups of interest to the user. Information related to the virtual user groups identified by the search engine is then communicated to the user system. The information may then be presented to the user via a pop-up screen which appears on an output device coupled to the user system. Examples of companies which provide such implicit search engines include Nano (http://www.nano.com/), Kenjin (http://www.autonomy.com/), Third Voice (http://www.thirdvoice.com/), Flyswat (http://www.flyswat.com), Gurunet (http://www.gurunet.com), Annotate (http://www.annotate.net/) and Alexa (http://www.alexa.com/).

After having identified a virtual user group of interest to the user (e.g., a virtual user group related to Thai cooking), the user may then join (or become a member of) the virtual user group in order to receive and exchange information from/with other members of the virtual user group. In order to become a member of a virtual user group, the user generally has to access a remote server hosting the virtual user group, and provide user related information to the server system hosting the virtual user group to join the virtual user group. The user-related information which the user may be required to provide to the hosting server may include the user's name, address, phone number, email address, and the like. This information is stored by the remote server system hosting the virtual user group. The user is then made a member of the virtual user group. The user may then receive and exchange information with other members of the virtual user group.

There are several ways in which conventional techniques (described above) of identifying and joining virtual user groups can compromise the user's privacy. Conventional search engine servers frequently track and/or mine information provided by the user to the search engine, or in the case of implicit search engines, received by the search engine from the user system. For example, several conventional search engines mine information contained in user search queries (which may contain information of a sensitive and private nature) provided to the search engines. The information is generally mined without the user's approval or authorization. In a Web environment, conventional search engines also track web sites, web pages, etc. accessed by the user, the content of the web pages, transactions performed by the user at the web sites, information related to virtual user groups which the user joins, information about virtual user groups related information accessed by the user, and other like information without the user's permission.

Likewise, user-related information provided by the user to server systems hosting virtual user groups during the joining/registration process may also be mined by the hosting server systems. The hosting server systems can track the identities of virtual groups which the user has joined, the information accessed by the user, and other like information related to the user's interactions with the virtual user group. The hosting servers can also track information which the user shares or exchanges with members of a virtual user group.

The information mined or tracked by conventional search engines or by server systems hosting virtual user groups can be used to ascertain information about the user's interests, likes/dislikes, the user's shopping preferences, information related to the user's use of the Internet, and other information related to the user and the user's behavior. The information can be used to build a detailed profile of the user and the user's browsing behavior. Further, since the user information is stored on computer systems remote from the user's computer system, the user has very little control on the collection and dissemination of the information.

User information collected by the search engines and the servers hosting the virtual user groups, which may be sensitive in nature and contain confidential information, may then be distributed or even sold to entities such as advertising agencies, government agencies, insurance companies, business entities, and the like, without the user's permission. This may result in the user being subjected to unsolicited Spam mail messages, unwelcome advertisements, credit card fraud, mail fraud, banking fraud, and other unwelcome activities. As a result, conventional techniques of identifying virtual user groups using search engines executing on remote servers, joining virtual user groups, and sharing or exchanging information with members of virtual user groups can severely compromise a user's privacy and consequently the user's security—even lead to loss of identity of the user.

In light of the above, there is a need for techniques which allow a user to identify virtual user groups of interest to the user, allow the user to become a member of one or more virtual user groups of interest to the user, and share or exchange information with members of virtual user groups joined by the user without compromising the user's privacy or security.

BRIEF SUMMARY OF THE INVENTION

According to the present invention techniques are provided which allow a user to share content information with other members of a virtual user group to which the user belongs without compromising the user's privacy. The content information to be shared with other members of a virtual user group is identified on the user computer system and can be shared with other members of a virtual user group. The present invention preserves user privacy by controlling and minimizing the amount of user-related information available/accessible to remote server systems hosting the virtual user groups.

According to an embodiment of the present invention, techniques are provided for communicating content information between user systems of members of a virtual user group. In this embodiment, a server system is configured to host a plurality of virtual user groups, the plurality of virtual user groups including a first virtual user group. A plurality of user systems are coupled to the server system, the plurality of user systems including a first user system and a second user system, each of the plurality of user systems storing information indicating that a user of the user system is a member of at least one virtual user group from the plurality of virtual user groups hosted by the server. The first user system is configured to store information indicating that a user of the first user system is a member of the first virtual user group, to receive a signal identifying content information to be communicated to user systems whose users are members of the first virtual user group, and to communicate the content information from the first user system to the server. The server is configured to communicate the content information received from the first user system to the plurality of user systems coupled to the server system. The second user system is configured to store information indicating that a user of the second user system is a member of the first virtual user group, to receive the content information from the server, to determine if the content information is related to the first virtual user group, and if the content information is determined to be related to the first virtual user group, to output the content information.

According to another embodiment of the present invention, techniques are provided for communicating content information from a first user system to a second user system. In this embodiment, a plurality of servers host a plurality of virtual user groups. The first user system is configured to store information indicating that a user of the first user system is a member of the plurality of virtual user groups, to receive a signal identifying content information, to determine a first virtual user group from the plurality of virtual user groups to which the content information is related, to determine the plurality of servers hosting the plurality of virtual user groups, the plurality of servers including a first server hosting the first virtual user group, and to communicate the content information from the first user system to the plurality of servers. The second user system is configured to receive the content information from the first server, to determine if the content information is related to the first virtual user group, and to output the content information if the content information is determined to be related to the first virtual user group.

According to yet another embodiment of the present invention techniques are provided for communicating content information from a first user system to a second user system. In this embodiment, a plurality of servers are configured to host a plurality of virtual user groups. The first user system is configured to store information indicating that a user of the first user system is a member of the plurality of virtual user groups, to receive a signal identifying content information, to determine a first virtual user group from the plurality of virtual user groups to which the content information is related, to determine, from the plurality of servers, a first server hosting the first virtual user group, and to communicate the content information from the first user system to the first server. The first server is configured to communicate the content information to a plurality of user systems, each user system of the plurality of user systems storing information indicating that a user of the user system is a member at least one virtual user group hosted by the first server, the plurality of user systems including the second user system. The second user system is configured to store information indicating that a user of the second user system is a member of the first virtual user group, to receive the content information from the first server, to determine if the content information is related to the first virtual user group, and to output the content information if the content information is determined to be related to the first virtual user group.

Various additional objects, features and advantages of the present invention can be more fully appreciated with reference to the detailed description and accompanying drawings that follow.

DETAILED DESCRIPTION OF THE INVENTION

According to the present invention techniques are provided which allow a user to identify one or more virtual user groups of interest to the user in a network environment, allow the user to become a member of (or join) one or more virtual user groups, and allow the user to receive and exchange information with members of the virtual user groups without compromising the user's privacy. More particularly, according to an embodiment of the present invention, virtual user groups of interest to a user are identified at the computer system used by the user ("user system") itself without having to provide information to search engines executing on remote servers where the user information may be tracked. Further, the user can join or become a member of one or more virtual user groups without having to provide user related information to remote server systems hosting the virtual user groups which the user desires to join. The user-related membership information is stored on the user computer rather than on the remote server hosting the virtual user group. Techniques according to the present invention also allow a user to receive virtual user group related information and share content information with members of a virtual user group which the user has joined without compromising the user's privacy.

The present invention thus preserves user privacy by controlling and minimizing the amount of user-related information available and/or accessible to remote server systems. The user-related information is stored locally on the user's computer system. Since the user has complete control over the distribution of information from the user system, the privacy of the user is preserved.

The present has been described below using a Web-based embodiment of the present invention. It should however be apparent that the present invention is not restricted to the Web environment, and may also be used in other network environments such as an intranet, a WAN, a wireless network, and the like.

Figure 1:
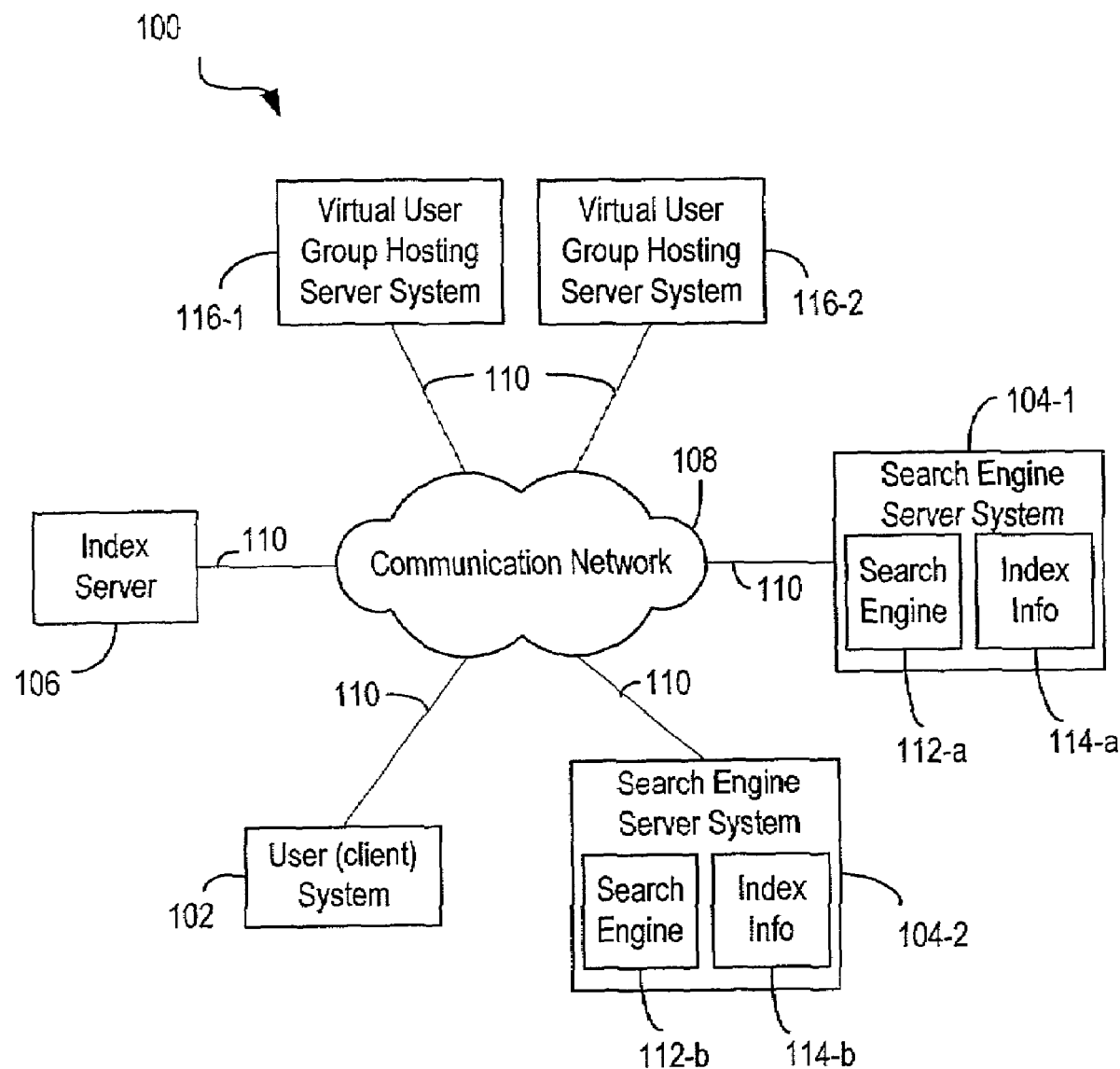
FIG. 1 is a simplified block diagram of a distributed computer network which may incorporate an embodiment of the present invention.

FIG. 1 is a simplified block diagram of a distributed computer network 100 which may incorporate an embodiment of the present invention. As shown, computer network 100 comprises a number of computer systems coupled to a communication network 108 via communication links 110. The computer systems depicted in FIG. 1 include a user computer system 102, search engine server systems (SESSs) 104-1 and 104-2, virtual user group hosting server systems (VUGHSSs) 116-1 and 116-2, and an index server 106. Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, a plurality of user systems 102 may be coupled to communication network 108. These user systems may be coupled directly to communication system 108 (e.g. user system 102 depicted in FIG. 1), or may alternatively be coupled to the communication network via an access provider (not shown) or via some other server system. It should be apparent that a particular computer system may function as a VUGHSS 116, a SESS 104, an index server system 106, or combinations thereof.

Communication network 108 provides a mechanism allowing the various components of computer network 100 to communicate and exchange information with each other. Communication network 108 may itself be comprised of many interconnected computer systems and communication links. While in one embodiment, communication network 108 is the Internet, in other embodiments, communication network 108 may be any suitable communication network including a local area network (LAN), a wide area network (WAN), a wireless network, a intranet, a private network, a public network, a switched network, and the like.

Communication links 110 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, extensible markup language (XML), wireless application protocol (WAP), vendor-specific protocols, customized protocols, and others.

According to an embodiment of the present invention, user system 102 can be used by users to identify virtual user groups of interest to the user, to become a member of one or more virtual user groups of interest to the user, to receive information related to the virtual user groups which the user has joined, and to exchange or share information with members of a virtual user group which the user has joined or become a member of. In a specific embodiment of the present invention, the user may use a browser program executing on user system 102 to facilitate the identification, joining, and information exchange activities. Users may also use user system 102 to access other information resources, such as web pages, stored by servers coupled to communication network 108. User system 102 generally functions as a client requesting information from the servers coupled to communication network 108. Further information related to functions performed by user system 102 are described below.

According to an embodiment of the present invention, a VUGHSS 116 hosts (or supports, or provide facilities for) one or more virtual user groups. For purposes of this application, the use of the phrase "virtual user group" is intended to include chat rooms, discussion groups, bulletin boards, online user groups, newsgroups, group mailing lists, and other online communities available in a network environment. For each virtual user group hosted by VUGHSS 116, VUGHSS 116 facilitates exchange of information between members of the hosted virtual user group. Further information related to the functions performed by VUGHSS 116 are described below.

SESSs 104 are servers which provide search engines 112 which may be used by users (using conventional techniques) to identify virtual user groups or other documents (e.g. web pages) of interest to users. SESSs 104 typically have access to index information 114 which is used by SESS 104 to facilitate the search process. For example, the index information may contain information identifying virtual user groups hosted by computer systems coupled to communication network 108, information related to the server systems (VUGHSSs 116) hosting the virtual user groups, information related to topics or subjects to which the virtual user groups are dedicated, and other information related to the virtual user groups. The index information is generally stored in a manner which facilitates identification of virtual user groups based on criteria (e.g., topic to which a virtual user group is dedicated, the name of a virtual user group, etc.) related to the virtual user groups. SESS 104 may be configured to communicate index information 114 to index server 106 or to user system 102. Further information related to functions performed by SESS 104 are described below.

According to the teachings of the present invention, index server 106 is configured to collect and/or generate index information identifying virtual user groups hosted by systems coupled to communication network 108, and to communicate the collected and/or generated index information to user system 102 to facilitate identification of virtual user groups of interest to the user on user system 102. According to an embodiment of the present invention, the index information communicated by index server 106 to user system 102 include indices information received by index server 106 from one or more SESSs 104 coupled to communication network 108. For example, for the distributed system depicted in FIG. 1, index server 106 may receive index information 114-a from SESS 104-1 and index information 114-*b* from SESS 104-2, and the index information communicated by index server 106 to user system 102 may include index information 114-*a* and 114-*b*. According to another embodiment of the present invention, index server 106 may receive indices information from SESSs 104, process the indices information, and then communicate the indices information to user system 102.

In yet other embodiments of the present invention, index server 106 may itself be configured to generate an index for information related to virtual user groups hosted by computer systems coupled to communication network 108. For example, index server 106 may use spiders and crawlers to collect information related to virtual user groups accessible via communication network 108 and build an index based on the collected information. Index server 106 may then communicate the generated index information to user system 102.

Figure 2:
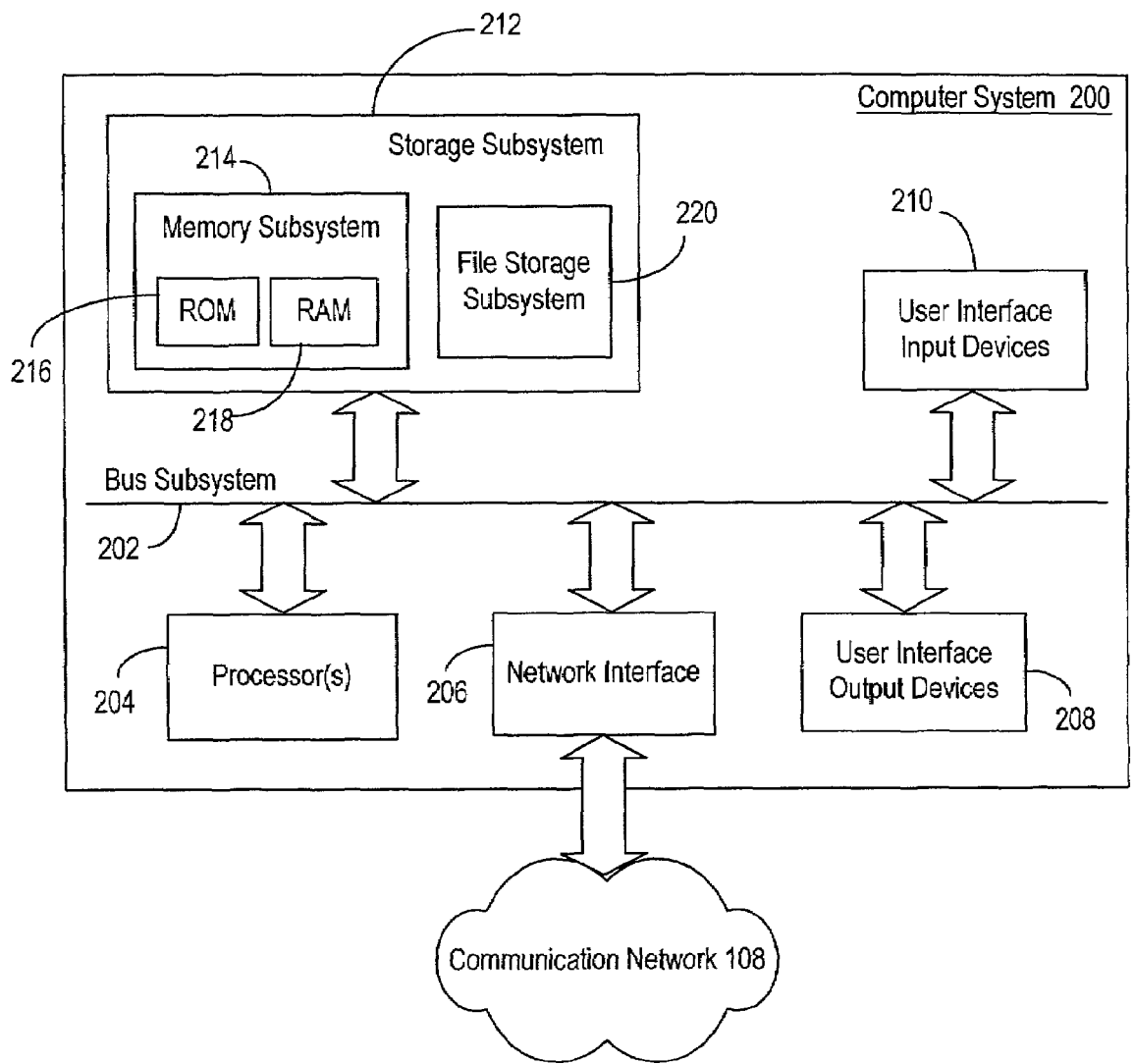
FIG. 2 is a simplified block diagram of a computer system according to an embodiment of the present invention.

FIG. 2 is a simplified block diagram of a computer system 200 according to an embodiment of the present invention. Computer system 200 may be used as a user system 102, an index server system 106, a SESS 104, a VUGHSS 116, and other systems coupled to communication network 108. As shown in FIG. 2, computer system 200 includes at least one processor 204, which communicates with a number of peripheral devices via bus subsystem 202. These peripheral devices may include a storage subsystem 212, comprising a memory subsystem 214 and a file storage subsystem 220, user interface input devices 210, user interface output devices 208, and a network interface subsystem 206. The input and output devices allow user interaction with computer system 200. A user may be a human user, a device, a process, another computer, and the like. Network interface subsystem 206 provides an interface to communication network 108 and may be coupled via the network to corresponding interface devices in other computer systems.

User interface input devices 210 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information into computer system 200 or to communication networks coupled to computer system 200.

User interface output devices 208 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200.

Storage subsystem 212 may be configured to store the basic programming and data constructs that provide the functionality of the computer system and of the present invention. For example, according to an embodiment of the present invention, software modules implementing the functionality of the present invention may be stored in storage subsystem 212. These software modules may be executed by processor(s) 204 of computer system 200. In a distributed environment, the software modules may be stored on a plurality of computer systems and executed by processors of the plurality of computer systems. Storage subsystem 212 may also provide a repository for storing various databases which may be used to store information according to the teachings of the present invention. Storage subsystem 212 may comprise memory subsystem 214 and file storage subsystem 220.

Memory subsystem 214 may include a number of memories including a main random access memory (RAM) 218 for storage of instructions and data during program execution and a read only memory (ROM) 216 in which fixed instructions are stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site coupled to communication network 108. Information stored according to the teachings of the present invention may also be stored by file storage subsystem 220.

Bus subsystem 202 provides a mechanism for letting the various components and subsystems of computer system 200 communicate with each other as intended. The various subsystems and components of computer system 200 need not be at the same physical location but may be distributed at various locations within distributed network 100. Although bus subsystem 202 is shown schematically as a single bus, alternative embodiments of the bus subsystem may utilize multiple busses.

Computer system 200 itself can be of varying types including a personal computer, a portable computer, a workstation, a computer terminal, a network computer, a mainframe, a kiosk, a personal digital assistant (PDA), a communication device such as a cell phone, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2. Computer system 200 may function as a client or a server, or combinations thereof.

Figure 3:
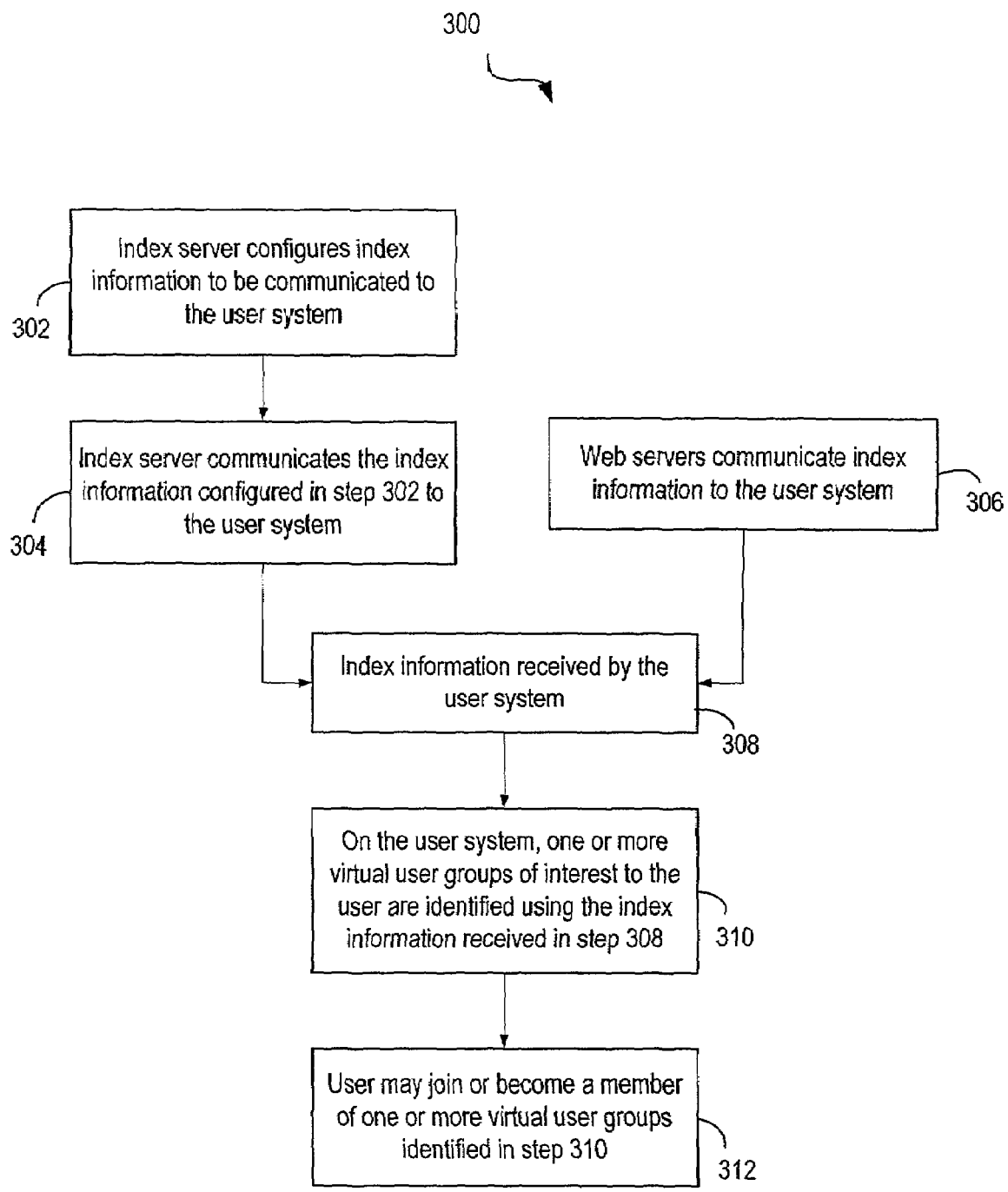
FIG. 3 is a simplified high-level flowchart depicting processing performed for identifying virtual user groups of interest to a user without compromising the user's privacy according to an embodiment of the present invention.

Techniques for Identifying Virtual User Groups of Interest to a User Without Compromising the User's Privacy FIG. 3 is a simplified high-level flowchart 300 depicting processing performed for identifying virtual user groups of interest to a user without compromising the user's privacy according to an embodiment of the present invention. Flowchart 300 depicted in FIG. 3 is merely illustrative of an embodiment incorporating the present invention and does not limit the scope of the invention as recited in the claims. One of ordinary skill in the art would recognize other variations, modifications, and alternatives.

As depicted in FIG. 3, index server 106 configures index information to be communicated to user system 102 (step 302). The index information configured by index server 106 comprises information related to the virtual user groups hosted by computer systems coupled to communication network 108. Index server 106 may use various techniques to configure the index information.

According to an embodiment of the present invention, index server 106 receives indices information from one or more SESSs 104 coupled to communication network 108 and configures the index information based on indices information received from the SESSs 104. For example, for the distributed system depicted in FIG. 1, index server 106 may receive index information 114-*a* from SESS 104-1 and index information 114-*b* from SESS 104-2, and configure the index information to be communicated to user system 102 based on index information 114-*a* and 114-*b*. Index server 106 may also process the indices information received from the SESSs before communicating the information to user system 102. As part of the processing, index server 106 may combine information contained in the various indices received from the various SESSs to form the index information to be communicated to user system 102

SESSs 104 may be configured to communicate index information to index server 106 on a periodic basis or in response to index information requests received from index server 106. The time period between transfers may be user configurable. Indices information may be communicated to index server 106 at regular time intervals to ensure that index server 106 has the latest snapshot of virtual user groups hosted by servers coupled to communication network 108. Various other techniques may also be used to ensure that index server 106 has up-to-date information.

In alternative embodiments of the present invention, index server 106 can itself generate an index for information related to virtual user groups hosted by computer systems coupled to communication network 108. For example, index server 106 may use spiders, crawlers, etc. to collect information related to virtual user groups hosted by computer systems coupled to communication network 108, and build an index based on the collected information.

Since the size of the index information can be quite large, according to an embodiment of the present invention, index server 106 performs processing to reduce the size of the index information to be communicated to user system 102. As part of this processing, index server 106 may use various data filters to reduce the size of the index information to be communicated to user system 102. The criteria for the data filters may be user configurable. Index server 106 may also use various data compression techniques to reduce the size of the index information communicated to user system 102. According to yet another embodiment, index server 106 might be configured to communicate index information to user system 102 in an incremental manner, such that only new or changed index information (a delta from the previously communicated index information) is communicated to user system 102.

According to an embodiment of the present invention, index server 106 may be configured to communicate only a portion (referred to as "partial index information") of the index information received by or configured by index server 106 to user system 102. Index server 106 may determine the contents of the partial index information to be communicated to user system 102 based on criteria provided to index server 106. According to an embodiment of the present invention, the criteria is user-configurable. The user configured criteria is generally abstract and generic enough that user privacy is not compromised. For example, a particular user may only be interested in virtual user groups related to Sports, and accordingly may indicate to index server 106 that the user system used by the user should only receive index information related to "Sports" related virtual user groups. In this scenario, index server 106 may extract information about virtual user groups related to sports from the index information received by or configured by index server 106, and communicate only the sports-related index information to user system 102 in step 304.

Index server 106 then communicates the index information configured in step 302 to user system 102 (step 304). The index information comprises information about virtual user groups hosted by computer systems coupled to communication network 108. The index information communicated to user system 102 may comprise information identifying one or more virtual user groups, information identifying VUGHSSs 116 hosting the one or more virtual user groups, information identifying topics or subjects to which the virtual user groups are dedicated, and other information. The information is generally organized in a manner which facilitates identification of a virtual user group based on criteria related to the virtual user group. The criteria may include for example, a name of the virtual user group, a topic or subject (e.g. Thai cooking) of a virtual user group, the number of members of a virtual user group, the location of the VUGHSS 116 hosting the virtual user group, attributes of the members of the virtual user group, and other attributes of the virtual user group.

According to an embodiment of the present invention, index server 106 is configured to communicate the index information to user system 102 on a periodic basis. The time period between transfers might be user configurable. Index information may be communicated to user system 102 at regular time intervals to ensure that user system 102 has the latest snapshot of virtual user groups hosted by computer systems coupled to communication network 108. Various other techniques may also be used to ensure that user system 102 has up-to-date information about virtual user groups supported by distributed network 100. In an alternative embodiment, index server 106 may communicate the index information to user system 102 in response to information requests received from user system 102. For example, user system 102 may send a signal to index server 106 requesting index server 106 to download the index information to the requesting user system.

In alternative embodiments of the present invention, SESSs 104 may directly communicate indices information to user system 102 (step 306). SESSs 104 may communicate the indices information to user system 102 on a periodic basis. The time period may be user configurable. In alternative embodiments, SESSs 104 may communicate the index information to user system 102 in response to requests received from user system 102.

Figure 4:
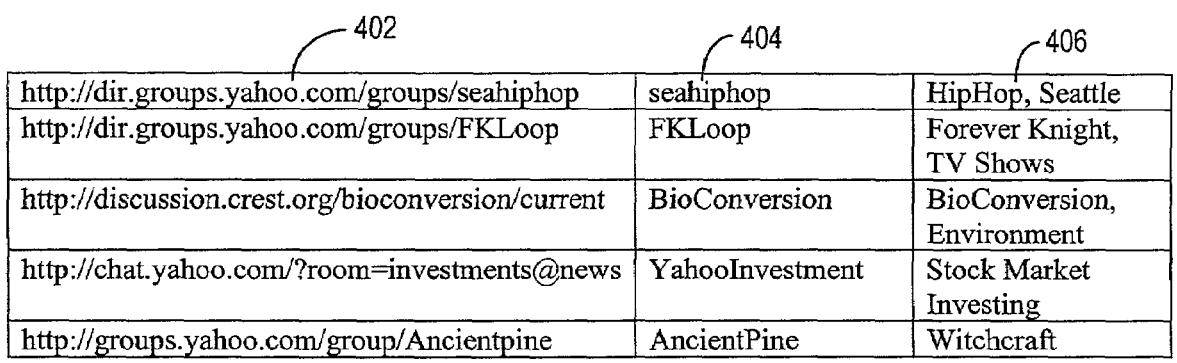
FIG. 4 depicts a portion of index information that may be communicated from the index server to the user system according to an embodiment of the present invention.

FIG. 4 depicts a portion of index information that may be communicated from index server 106 to user system 102 according to an embodiment of the present invention. The index information depicted in FIG. 4 comprises information related to a plurality of virtual user groups. For each virtual user group, the information indicates an URL 402 which can be used to access the virtual user group, a name 404 of the virtual user group, and a list of topics 406 that the virtual user group is about or is dedicated to. For example, URL "http://dir.groups.yahoo.com/groups/seahiphop" can be used to access virtual user group named "seahiphop" which is related to the topics HipHop and Seattle. User system 102 can process this index information to find virtual user groups that might be of interest to the user. It should be apparent that the index information received by user system 102 may be in various other formats and may contain more or less information than the portion of the index information depicted in FIG. 4.

Referring back to FIG. 3, at step 308, user system 102 receives the index information communicated either from index server 106 or from one or more SESSs 104 (step 308). The index information received by user system 102 from index server 106 or from SESSs 104 might then be used to identify one or more virtual user groups of interest to the user on the user system (step 310). Various different techniques may be used to identify virtual user groups of interest to or relevant to the user using the index information received in step 308. According to the teachings of the present invention, for each of the identification techniques, the entire processing for identifying virtual user groups of interest to the user is performed on user system 102 itself, substantially free from any interaction with SESSs 104, VUGHSSs 116 and index server 106. Unlike conventional search engines, the user does not have to provide search queries or other information to remote search engine servers where the information may be mined and/or tracked. Since all identification operations are performed locally on user system 102, the user has complete control over the type of information which can be tracked during the identification process, and also has complete control over the distribution of the information. The user's privacy is thus preserved as user-related information cannot be tracked/mined or accessed by any computer system remote from the user system 102 without the user's authorization.

Since virtual user groups of interest to the user are identified based on index information which is locally stored on user system 102, user system 102 does not have to be connected to communication network 108 during the identification process, i.e. the index information received by user system 102 can be searched and the relevant virtual user groups identified in an offline manner. This is substantially different from conventional search engines executing on remote servers which require that the user system have a network connection (i.e. be online) to the server executing the search engine in order for the search to be performed and relevant virtual user groups identified. Local access to the index information also increases the speed of the identification process as compared to conventional network-based search techniques which are usually executed on one or more remote servers.

As indicated above, various techniques may be used to identify virtual user groups of interest to (or relevant to) the user using the index information received in step 308. According to an embodiment of the present invention, a localized search engine is provided to facilitate the identification of relevant virtual user groups. The localized search engine executes on user system 102 and is configured to accept a search query/request from the user, and to search the index information to identify virtual user groups which satisfy the search query. According to an embodiment of the present invention, the localized search engine may be coupled to a browser program executing on user system 102 and receive the search query via the browser interface.

The user search query may contain query terms which describe, for example, a topic or subject for which the user is interested in finding virtual user groups. For example, if the user is interested in finding virtual user groups dedicated to Thai cooking, the query terms may include the words "Thai" and "cooking." In response to the query, the localized search engine is configured to search the index information and identify virtual user groups dedicated to Thai cooking. Various different comparison and search techniques may be used by the localized search engine to search the index information to identify virtual user groups relevant to the user query. Information related to virtual user groups identified by the localized search engine may be presented to the user via an output device coupled to user system 102, e.g., via a browser interface.

Unlike conventional search engines executing on remote servers, the localized search engine executes locally on user system 102 and uses index information (received from index server 106 or from SESSs 104) which is stored locally by user system 102. Accordingly, virtual user groups of interest to the user can be identified without having to communicated user queries to remote search engine servers where the information contained in the queries may be mined or tracked by the servers. Since all operations are performed on user system 102, the user has complete control on the type of information, if any, which is tracked/stored by the localized search engine. The user also has complete control over the distribution of the information tracked by the localized search engine. The user's privacy is thus preserved as user-related information cannot be tracked or mined or distributed from user system 102 without the user's authorization. Computer systems, other than the user's computer system, do not have access to user information.

As described above, the localized search engine provides a tool for identifying virtual user groups of interest to a user based on search queries provided by the user.

According to another embodiment of the present invention, virtual user groups of interest to the user may be automatically identified without any user interaction based upon index information received by user system 102 from index server 106 or from SESSs 104 and based upon user-related information which may be stored (e.g. a user profile) by user system 102. The user profile may include information about a user's likes/dislikes, preferences, commonly visited web pages, concepts or topics of interest to the user, virtual user groups of interest to the user, and other information characterizing the user's preferences or the user's browsing behavior.

According to an embodiment of the present invention, an "automated virtual user group selector" module is provided which executes on user system 102 and identifies virtual user groups of potential interest to the user based upon user information accessible via user system 102 (e.g., user information stored in a user profile file). Information related to virtual user groups identified by the automated virtual user group selector module to be of potential interest to the user may be presented to the user via an output device coupled to user system 102. Like with the other virtual user group identification techniques, according to the present invention, the processing performed to automatically identify virtual user groups of interest to the user is performed locally on user system 102 substantially free from any interaction with SESSs 104, VUGHSSs 116 and index server 106. The user thus has complete control over the type of information which is stored by the identification techniques and over the dissemination of the information. This helps preserve the privacy and security of the user.

The user profile information may have been collected using various techniques. Examples of techniques for collecting user information and generating user profiles are described in U.S. patent application Ser. No. 09/510,902 entitled "METHOD FOR CREATING USER PROFILES", U.S. patent application Ser. No. 09/511,034, entitled "SYSTEM FOR CREATING USER PROFILES", and U.S. patent application Ser. No. 09/510,904, entitled "COMPUTER PROGRAM FOR CREATING USER PROFILES", the entire disclosures of which are herein incorporated by reference for all purposes.

According to an embodiment of the present invention, the localized search engine described above may also be used to collect user information which may be used for building a user profile. The localized search engine may provide a user-configurable option which when selected by the user enables the localized search engine to mine the query information provided by the user to the localized search engine. The information mined by the localized search engine may then be used to build or augment the user profile information stored by user system 102. Since the mining/ tracking of information is user-configurable and performed locally on user system 102, the user can control when and what type of information is mined by the localized search engine. Further, since the mined information is stored locally on the user system, the user also has complete control over the distribution/communication of the tracked information. The privacy of user information is thus not compromised.

Various other techniques may also be used to identify virtual user groups of interest to the user based upon index information received from index server 106 and/or from SESSs 104.

Referring back to FIG. 3, the user may then join or become a member of one or more virtual user groups from the virtual user groups identified in step 310 (step 312). The process of joining a virtual user group according to the teachings of the present invention is described in the following section.

As described above, the present invention enables a user to identify virtual user groups of interest to the user in a network environment without compromising user privacy. Instead of using remote search engine servers which can mine user information to identify virtual user groups of interest to the user, the present invention identifies the relevant virtual user groups based upon index information received by user system 102. Since the process of identifying virtual user groups of interest to the user is performed locally on user system 102 using index information locally stored on user system 102, remote servers such as index server 106, SESSs 104, and VUGHSSs 116 do not receive any information (e.g. search queries, etc.) related to the user which can be mined to build user profiles. Accordingly, the identification of virtual user groups of interest to the user is performed by the user system substantially free from any interactions with other computer systems coupled to communication network 108. User privacy and security is consequently preserved.

Techniques for Joining One or More Virtual User Groups of Interest to a User and for Receiving Information Related to Virtual User Groups Joined by the User Without Compromising the User's Privacy After virtual user groups of interest to the user have been identified (e.g. according to flowchart 300 depicted in FIG. 3), the user may then join (or become a member of) one or more of the identified virtual user groups. In general, use of the phrase "join a virtual user group" is intended to include becoming a member of the virtual user group, registering as an user of the virtual user group, enrolling in a virtual user group, subscribing to a virtual user group, enlisting in a virtual user group, and the like.

Figure 5:
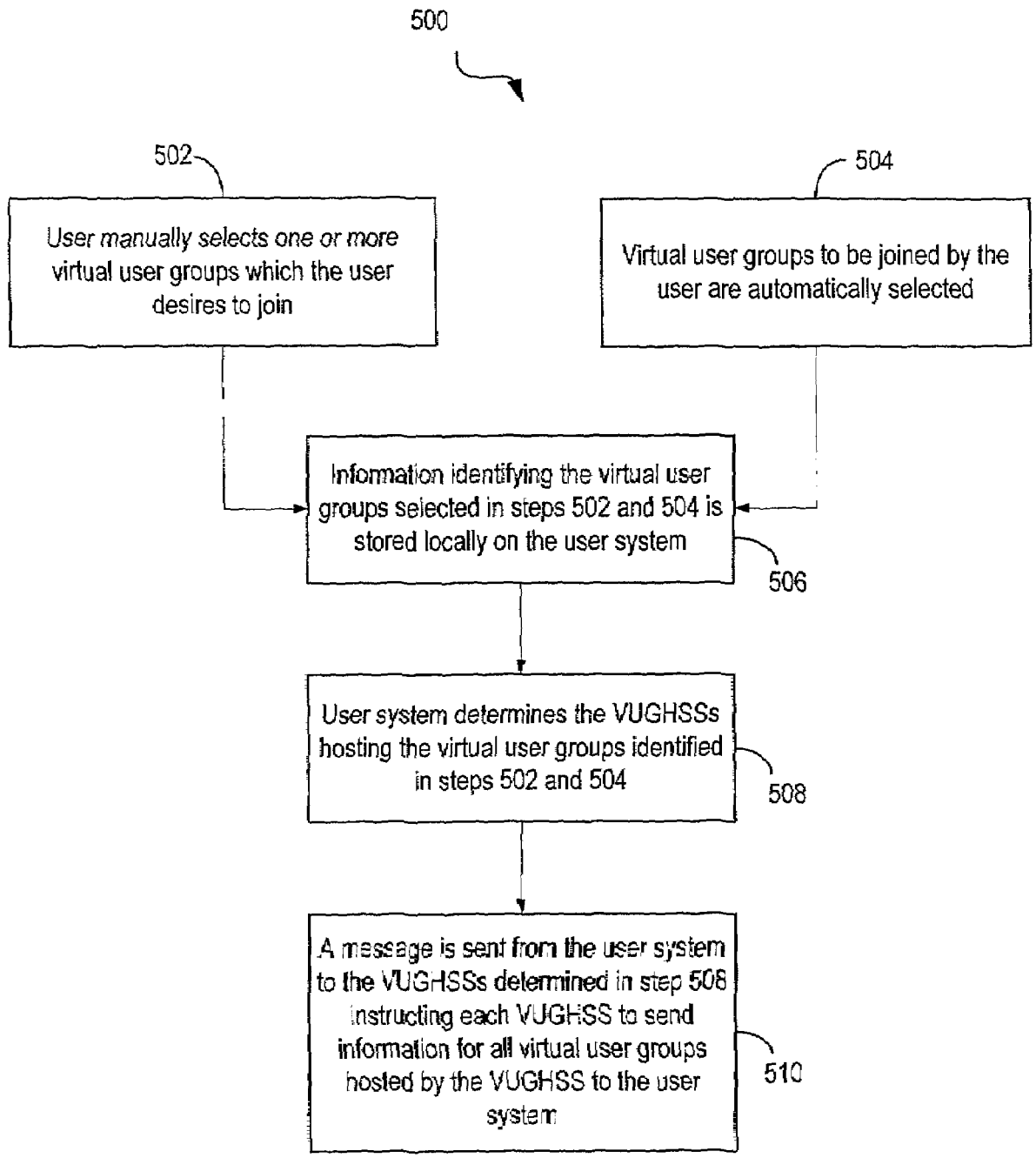
FIG. 5 is a simplified high-level flowchart depicting processing performed for joining a virtual user group without compromising the user's privacy according to an embodiment of the present invention.

FIG. 5 is a simplified high-level flowchart 500 depicting processing performed for joining a virtual user group without compromising the user's privacy according to an embodiment of the present invention. Flowchart 500 depicted in FIG. 5 is merely illustrative of an embodiment incorporating the present invention and does not limit the scope of the invention as recited in the claims. One of ordinary skill in the art would recognize other variations, modifications, and alternatives.

As depicted in FIG. 5, the user may manually select one or more virtual user groups to which the user desires to join (step 502). For example, virtual user groups identified by the localized search engine may be output to the user via an output device (e.g., a monitor) coupled to the user system. According to an embodiment of the present invention, the virtual user groups may be presented to the user via a browser enabled interface. From the virtual user groups presented to the user, the user may then, using an input device coupled to user system 102 (e.g., a mouse), manually select one or more virtual user groups which the user desires to join.

Alternatively, virtual user groups of which the user is to be made a member may be automatically selected (step 504). For example, the automated virtual user group selector module (described above) may automatically identify virtual user groups of potential interest to the user based upon user information accessible via user system 102 (e.g., user information stored in a user profile file). According to an embodiment of the present invention, the virtual user groups identified by the automated virtual user group selector module are presented to the user via an output interface (e.g. via a browser interface), and the user is manually allowed to select one or more virtual user groups to join according to step 502. However, in alternative embodiments of the present invention, automated virtual user group selector module may automatically select one or more of the virtual user groups identified by the automated virtual user group selector module to be joined by the user according to step 504.

Information identifying the virtual user groups selected in steps 502 and/or 504 is then stored locally on user system 102 (step 506). The stored information corresponds to membership information for the user. According to an embodiment of the present invention, a "membership processor module" is provided which executes on user system 102 and is configured to receive information identifying the virtual user groups selected in steps 502 and/or 504 and store the information in a "membership information" file on user system 102. The information stored in the membership information file identifies all the virtual user groups which the user has joined. For each virtual user group joined by the user, the information stored in the membership information file may comprise information identifying the virtual user group, information indicating the subject or topic to which the virtual user group is dedicated, information identifying the VUGHSS 116 hosting the virtual user group, and other information.

The membership processor module then determines VUGHSSs 116 which host the virtual user groups identified in steps 502 and 504 (step 508). For each VUGHSS 116 identified in step 508, a message is sent from user system 102 to the VUGHSS instructing the VUGHSS to send to user system 102, on a continuing basis, information related to all virtual user groups hosted by the VUGHSS, including information related to virtual user groups not joined by the user (step 510). As explained below, the virtual user groups information received by user system 102 from the VUGHSSs 116 is then processed at user system 102 to extract information related to virtual user groups which the user has joined.

As can be seen from flowchart 500 depicted in FIG. 5, according to the teachings of the present invention, VUGHSSs 116 do not receive any information related to the virtual user groups which the user has joined. The VUGHSSs only receive a message from user system 102 indicating that information related to all virtual user groups, including virtual user groups not joined by the user, hosted by the VUGHSSs is to be communicated to user system 102. Thus, VUGHSSs 116 have no way of determining which specific virtual user groups the user has joined.

Unlike prior art systems, the VUGHSSs also do not receive any user-specific information such as the name of the user, the address of the user, and the like. Since the membership information (which may be stored in a membership information file) is stored locally on user system 102, the user has complete control over the distribution of the information and can prevent all unauthorized access to the information. Consequently, VUGHSSs 116 do not have access to any information related to the user or information regarding the virtual user groups joined by the user which can be used to build user profiles or which can be sold or distributed without the user's permission. In this manner, the user's privacy is preserved.

Figure 6:
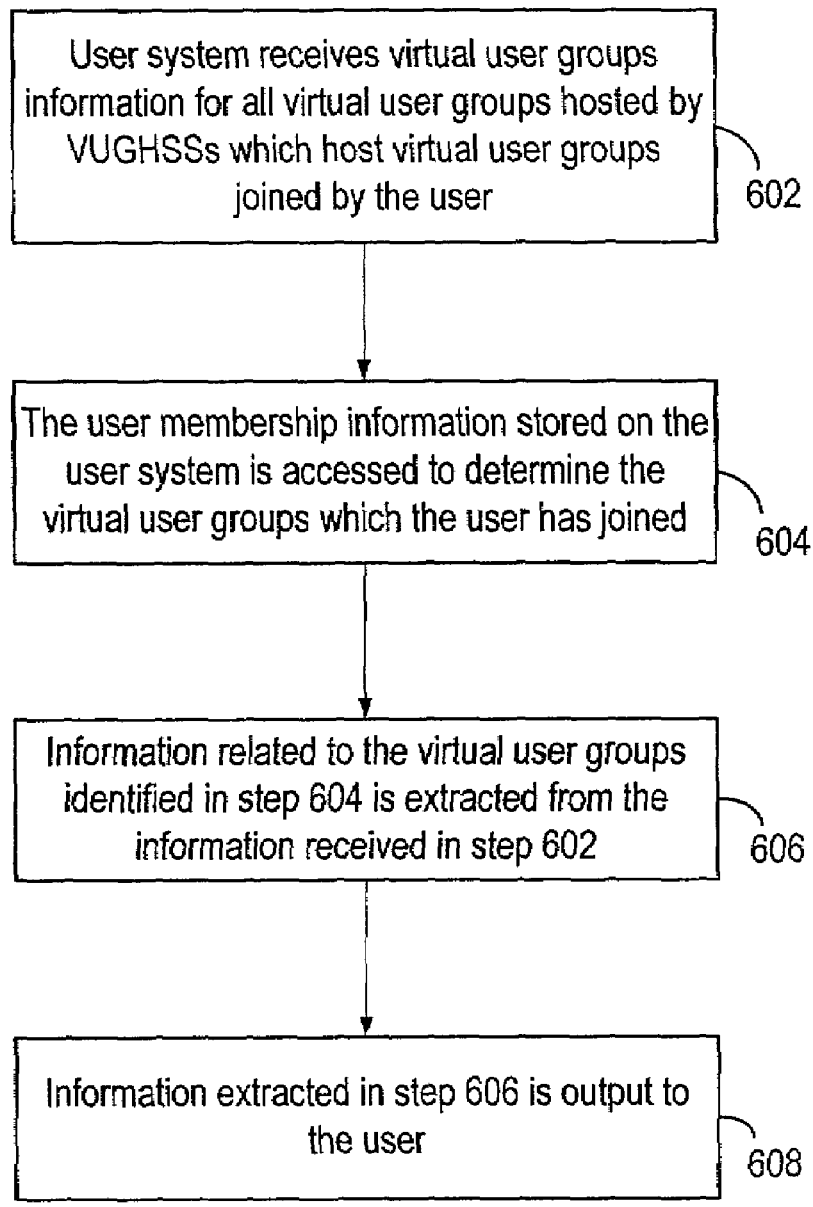
FIG. 6 is a simplified high-level flowchart depicting processing performed for receiving information related to virtual user groups which the user has joined according to an embodiment of the present invention.

After the user has joined one or more virtual user groups (e.g. according to flowchart 500 depicted in FIG. 5), the user may then receive information related to the virtual user groups which the user has joined (e.g., information sent by other members of the virtual user groups). FIG. 6 is a simplified high-level flowchart 600 depicting processing performed for receiving information related to virtual user groups which the user has joined according to an embodiment of the present invention. Flowchart 600 depicted in FIG. 6 is merely illustrative of an embodiment incorporating the present invention and does not limit the scope of the invention as recited in the claims. One of ordinary skill in the art would recognize other variations, modifications, and alternatives. All of the steps depicted in FIG. 6 are performed on user system 102. These steps may be performed by hardware modules or by software modules executing on user system 102, or combinations thereof.

As depicted in FIG. 6, user system 102 receives related information from VUGHSSs 116 which host virtual user groups joined by the user (step 602). The information received in step 602 comprises information related to all virtual user groups hosted by the VUGHSSs, including information related to virtual user groups not joined by the user. According to an embodiment of the present invention, a VUGHSS 116 may be configured to communicate information related to all virtual user groups hosted by the VUGHSS to user system 102 at periodic time intervals. According to an alternative embodiment of the present invention, for each virtual user group hosted by a VUGHSS 116, the VUGHSS 116 may be configured to communicate information related to the virtual user group to user system, 102 whenever VUGHSS 116 receives information related to the virtual user group.

Upon receiving the information according to step 602, a module (e.g. a "content analysis module") executing on user system 102 accesses user membership information stored locally on user system 102 to determine the virtual user groups which the user has joined (step 604). According to an embodiment of the present invention, information for the virtual user groups identified in step 604 is then extracted from the information received in step 602 (step 606). The extracted information comprises information related to virtual user groups which the user has joined. During step 606, content analysis module determines if the information received in step 602 contains information related to virtual user groups joined by the user (i.e., the virtual user groups determined in step 604).

According to an embodiment of the present invention, the content analysis module may determine one or more topics to which information received in step 602 is related. The content analysis module may then determine topics related to the virtual user groups determined in step 604. If the information received in step 602 and a particular virtual user group determined in step 604 are both related to the same topic, then that information may be identified as being related or relevant to the particular virtual user group. If the content analysis module determines that the information received in step 602 comprises information related to virtual user groups identified in step 604, then that information is extracted.

The information extracted in step 606 is then output to the user (step 608). According to an embodiment of the present invention, the extracted information may be output to the user via a browser enabled interface. In this manner, the user can access and view information related to virtual user groups joined by the user.

According to the teachings of the present invention, steps 604, 606, and 608 depicted in FIG. 6 are performed by user system substantially free from any interaction with VUGHSSs 116, SESSs 104, and index server 106. In particular, VUGHSSs 116 do not receive any information about the virtual user groups which the user has joined. VUGHSSs 116 also do not have any knowledge about the virtual user group related information accessed by the user using user system 102. VUGHSSs 116 cannot determine or track any user related information, and thus have no way of determining which specific virtual user groups the user has joined. Consequently, the VUGHSSs do not have access to and/or cannot track or mine user-related information which can be used to build user profiles or which can be sold or distributed without the user's permission. In this manner, the user's privacy is preserved.

An alternative embodiment of the current invention uses a content driven network which allows a user to subscribe to and receive content related to a virtual user group with privacy. A content driven network is a virtual broadcast network set up within a communication network such as the Internet by a set of routers that implement a content driven routing protocol. The client computers at the edge of the network register with their nearest routers the topics they are interested in. For example, a particular user client computer could inform the nearest router that it is interested in Baseball content. The router aggregates all the topics of interest to all the clients and subscribes to the aggregated list of topics from the upstream node. Thus, when the router receives content on Baseball, it automatically forwards the content to all user client systems which have subscribed to Baseball. In this model, the subscription information is stored at the local router, not at the central server, thus preserving user privacy.

Figure 7:
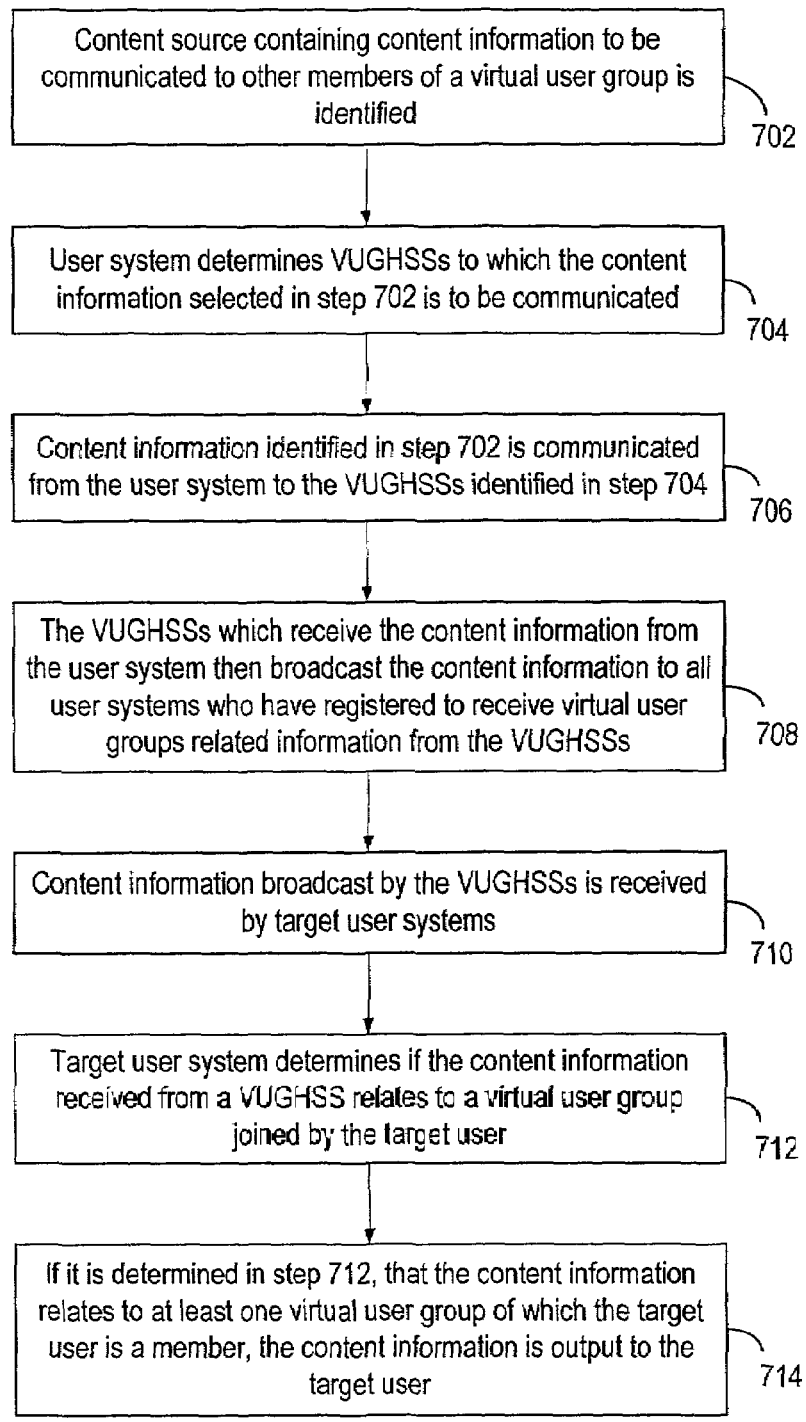
FIG. 7 is a simplified high-level flowchart depicting processing which enables a user to exchange content information with other members of a virtual user group to which the user belongs without compromising the user's privacy, according to an embodiment of the present invention.

Techniques for Allowing a User to Exchange Content Information with other Members of a Virtual user Group Without Compromising the User's Privacy FIG. 7 is a simplified high-level flowchart 700 depicting processing which enables a user to exchange content information with other members of a virtual user group to which the user belongs without compromising the user's privacy, according to an embodiment of the present invention. Flowchart 700 depicted in FIG. 7 is merely illustrative of an embodiment incorporating the present invention and does not limit the scope of the invention as recited in the claims. One of ordinary skill in the art would recognize other variations, modifications, and alternatives.

As depicted in FIG. 7, a content source whose contents are to be communicated to other members of a virtual user group to which the user belongs is identified and/or selected on the user system (step 702). Examples of content sources include a web page viewed by the user, an electronic message configured by the user, a document viewed by the user, and other types of information sources accessed or viewed by the user.

According to an embodiment of the present invention, the user can manually indicate the content source whose contents are to be communicated to the other virtual user group members. For example, if the user is viewing a web page (e.g., a web page showing a Thai recipe) using a browser executing on user system 102, and would like to share contents of the web page with other members of a particular virtual user group (e.g., a virtual user group dedicated to Thai cooking) to which the user belongs, the user may use the browser to tag or select the web page as a content source whose contents are to be shared with other members of the particular virtual user group. A menu option, a button, or some other selection means may be provided by the browser which allows the user to select the content source. Various other techniques (other than techniques provided by the browser) might also be provided to allow the user to select the content source and the information to be shared with other members of a virtual user group to which the user belongs using user system 102.

In alternative embodiments of the present invention, the content information to be shared with other members of a virtual user group to which the user belongs may be identified automatically by user system 102 based on documents, web pages, or other content information sources accessed or viewed by the user. In this embodiment, a "content analysis module" is provided which executes on user system 102 and analyzes the contents of documents or other content sources viewed or accessed by the user using user system 102. The content analysis module analyzes the contents of the content source to determine if the contents are relevant to or related to one or more virtual user groups of which the user is a member. If the content analysis module identifies a particular document or content source to contain content information which is relevant to a particular virtual user group to which the user belongs, then that content source or document is automatically tagged or selected by the content analysis module as comprising content information to be communicated to other members of the particular virtual user group.

The content analysis module may use several techniques to automatically determine if a document or content source is relevant to virtual user groups which the user has joined. According to an embodiment of the present invention, content analysis module analyzes the contents of the document or content source viewed by the user and classifies the document as containing information related to a particular subject or topic. Content analysis module then determines, for example, based on information in the membership information file stored on user system 102, if the particular topic or subject of the document relates to one or more virtual user groups joined by the user. If the particular subject or topic of the document is related to a particular virtual user group, than that document is tagged as containing content information relevant to the particular virtual user group, and content information of the document is selected to be communicated to other members of the particular virtual user group.

For example, lets assume that the user is viewing a web page displaying a Thai cooking recipe and that the user is a member of a virtual user group dedicated to Thai Cooking. The content analysis module processes the contents of the web page and classifies the web page as containing information related to Thai cooking. Content analysis module then accesses the membership information file for the user to determine virtual user groups which the user has joined, and determines that the web page is related to the virtual user group dedicated to Thai cooking. The contents of the web page are then selected to be shared with other members of the virtual user group dedicated to Thai cooking.

Referring back to FIG. 7, after content information (i.e. content contained in the content source identified in step 702) to be shared with members of a virtual user group has been identified or selected (either manually by the user or automatically), user system 102 then determines VUGHSSs 116 to which the content information is to be communicated (step 704). According to an embodiment of the present invention, all the VUGHSSs 116 which host virtual user groups joined by the user are selected to receive the content information identified in step 702 from user system 102. According to another embodiment, modules executing on user system 102 determine the specific virtual user group(s) to which the content information is relevant, and select only the VUGHSSs 116 hosting those specific virtual user group(s) to receive the content information.

The content information selected in step 702 is then communicated from user system 102 (referred to as the "source user system" for clarity) to VUGHSSs 116 identified in step 704 (step 706). Each VUGHSS 116 which receives the content information then broadcasts the content information to all user systems who have registered to receive virtual user groups information from the VUGHSS 116 (step 708). These user systems generally include systems of users who have joined at least one virtual user group hosted by the VUGHSS 116. The content information broadcast by the VUGHSSs 116 is then received by user systems who have indicated to the VUGHSSs 116 that they are interested in receiving information for all virtual user groups hosted by the VUGHSSs 116 (step 710). For sake of discussion these user systems will be referred to as "target user systems" to differentiate them from the source user system which communicated the content information to the VUGHSSs 116. The user of a target user system will be referred to as a "target user."

The format in which content information is communicated from the source user system to VUGHSS 116 and from VUGHSS 116 to the target user system may vary in different embodiments of the present invention. According to an embodiment of the present invention, the content information may be communicated in the same format as the original content source. For example, if the content source selected in step 702 was a web page, the content information might be communicated from the source user system to VUGHSS 116 and from VUGHSS 116 to the target user system in the form of a web page. However, in alternative embodiments of the present invention, various other formats (e.g. plain text, word processor format, email, fax, image, etc.) may also be used to communicate the contents of the selected web page.

A target system then determines whether the content information received from one or more VUGHSSs 116 is related to or relevant to the virtual user groups joined by the target user (step 712). As described above, the content analysis module may use several different techniques to determine if the content information received from the VUGHSSs 116 is related to one or more virtual user groups of which the target user is a member. According to an embodiment of the present invention, a content analysis module executing on the target user system determines the virtual user groups which the target user has joined by accessing membership information for the target user stored on the target user system. The content analysis module then determines if the content information is related to one or more virtual user groups joined by the user.

If the content analysis module determines in step 712 that the content information is related to at least one virtual user group of which the target user is a member, then the content information is output to the target user (step 714). Conversely, if the content analysis module determines in step 712 that the content information is not related to any virtual user group of which the target user is a member, then the content information is not output to the target user.

For example, lets assume that the content information included contents of a web page displaying a Thai recipe, and the target user is a member of the virtual user group dedicated to Thai cooking. In this scenario, the content analysis module executing on the target user system determines that the content information is relevant to the Thai cooking virtual user group of which the target user is a member, and the contents of the web page are output to the target user via an output device coupled to target user system 102. According to an embodiment of the present invention, the content information is output to the target user via a browser-enabled interface. However, in alternative embodiments of the present invention, the content information may be output to the user in other forms such as an electronic mail message, a fax, as audio signals, as video signals, etc.

In this manner, a member of a particular virtual user group can identify content information to be shared with other members of a virtual user group joined by the user. The content information identified by the user (or automatically identified) is then communicated to other members of the virtual user group and can be accessed by the members using the members' user systems. Information of common interest can thus be shared between members of a virtual user group. The user identifying the content information need not know the email addresses or contact information of the other members of the virtual user group in order to share the information with the other members. Further, during the entire information exchange process, VUGHSSs 116 do not have access to any user-related information. VUGHSSs 116 also do not receive or have access to information which might allow the VUGHSSs to deduce virtual user groups to which the user or the other members belong. The privacy of the user and other members of the virtual user group is thus preserved.

User System Modules and Information

Figure 8:
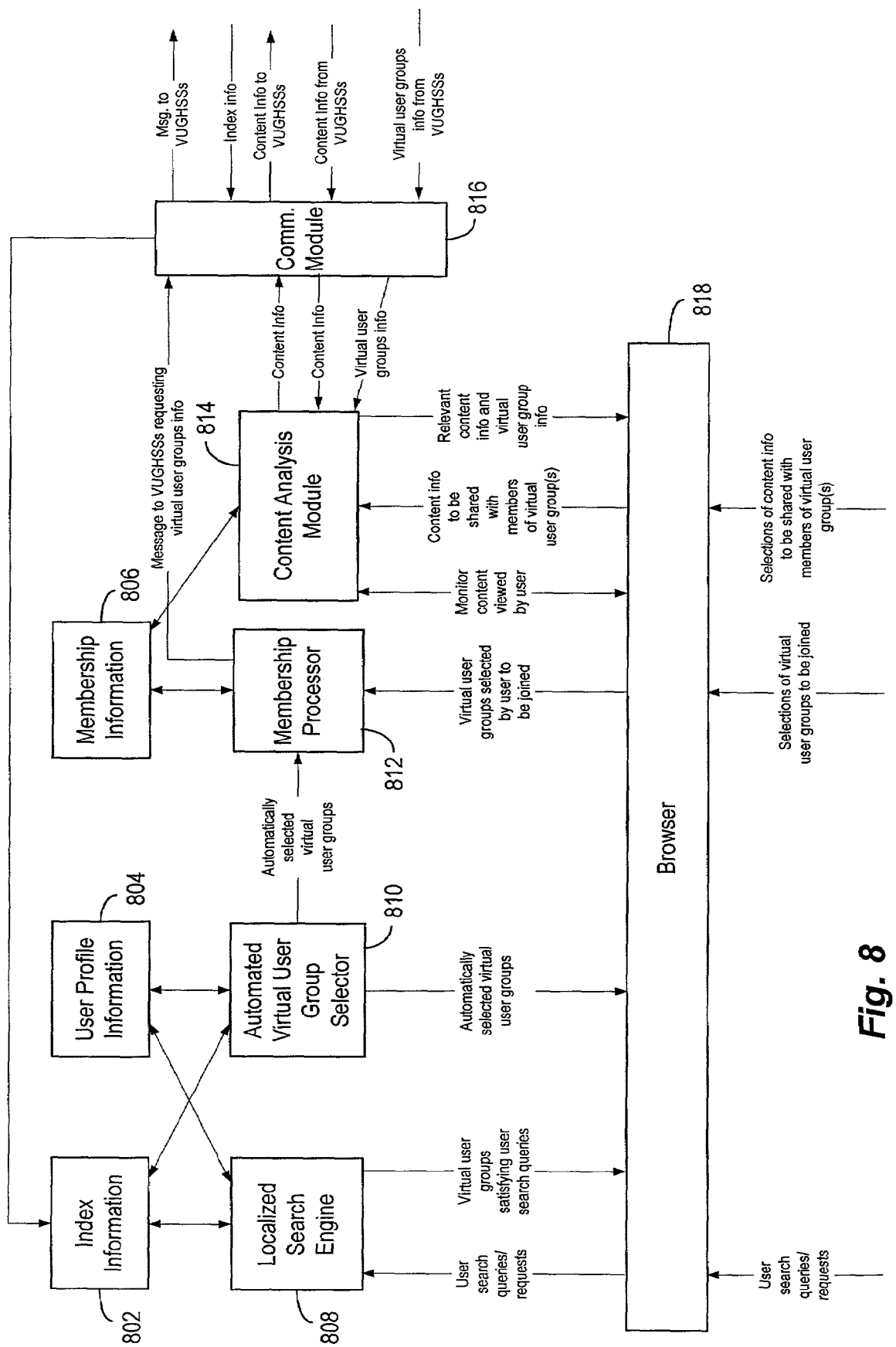
FIG. 8 depicts information stored by the user system and modules which are executed by the user system to provide features according to an embodiment of the present invention for identifying virtual user groups of interest to the user, for joining virtual user groups of interest to the user, for receiving information related to the virtual user groups, and for exchanging/sharing content information with members of a virtual user group.

FIG. 8 depicts information stored by user system 102 and modules which are executed by user system 102 to provide features (described above) according to an embodiment of the present invention for identifying virtual user groups of interest to the user, for joining virtual user groups of interest to the user, for receiving information related to the virtual user groups, and for exchanging/sharing content information with members of a virtual user group. The modules and information depicted in FIG. 8 are merely illustrative of an embodiment incorporating the present invention and do not limit the scope of the invention as recited in the claims. One of ordinary skill in the art would recognize other variations, modifications, and alternatives. For example, in alternative embodiments of the present invention, one or more of the modules depicted in FIG. 8 may be combined into a single module, and/or a single module depicted in FIG. 8 may be broken down into several modules. The modules depicted in FIG. 8 may be implemented in software or hardware, or combinations thereof. The software modules are executed by the processor of user system 102.

According to an embodiment of the present invention, the modules depicted in FIG. 8 include a browser program module 818, a localized search engine module 808, an automated virtual user group selector module 810, a membership processor module 812, a content analysis module 814, and a communication module 816. The information stored by user system 102 may include index information 802, user profile information 804, and membership information 806. Index information 802 contains information related to virtual user groups hosted by computer systems in a network environment. As described above, index information 802 is received from index server 106 or from SESSs 104. User profile information 804 comprises information related to the user's preferences, likes/dislikes, etc. Membership information 806 comprises information identifying one or more virtual user groups which the user of user system 102 has joined and become a member. Index information 802, user profile information 804, and membership information 806 can be stored in the storage subsystem of user system 102.

According to an embodiment of the present invention, communication module 816 is configured to facilitate communication of information and data to and from user system 102. Communication module 816 receives index information either from index server 106 or from SESSs 104. Communication module 402 may store the index information in the storage subsystem of user system 102 or may alternatively forward the index information to appropriate modules of user system 102. Communication module 816 is also configured to communicate messages received from membership processor module 812 to VUGHSSs 116 instructing VUGHSSs 116 to send information related to virtual user groups (even virtual user groups which the user has not joined) hosted by VUGHSSs 116 to the user system. Communication module 816 may receive content information to be shared with members of a virtual user group from content analysis module 814. Communication module 816 is configured to communicate the content information to the appropriate VUGHSSs 116 as described above. Communication module 816 may also receive content information and virtual user groups related information from VUGHSSs 116. The content information and virtual user groups related information received by communication module 816 is forwarded to content analysis module 814 for further processing. Communication of other information to and from user system 102 is also handled by communication module 816.

As described above, browser program 818 allows a user to select, retrieve, and access information resources stored by communication network 108. Examples of browsers include the Internet Explorer browser program provided by Microsoft Corporation, and the Netscape Navigator browser provided by Netscape Corporation, and others. In a Web environment, browsers allow users to access web pages. According to an embodiment of the present invention, browser 818 provides an interface for outputting virtual user group related information to the user and for receiving inputs/selections from the user. For example, a user may configure and provide search requests/queries to local search engine 808 via browser 818. Virtual user groups identified by local search engine 808 in response to the queries are output to the user via browser 818. Virtual user groups selected by automated virtual user group selector module 810 may also be output to the user via browser 818. The user may use browser 818 to select one or more virtual user groups which the user desires to join. Browser 818 forwards information identifying the virtual user groups selected by the user to membership processor 812 for further processing. The user may also use browser 818 to identify content information to be shared/exchanged with other members of a virtual user group. Virtual user group related information and content information related to virtual user groups joined by the user may be output to the user via browser 818. Browser 818 may also allow the user to interact with the modules depicted in FIG. 8.

According to an embodiment of the present invention, localized search engine 808 is configured to identify virtual user groups of interest to the user based upon index information 802 and based upon search queries received from the user describing topics or concepts of interest to the user and for which the user is interested in finding relevant virtual user groups. As shown in FIG. 8, localized search engine 808 may receive the user search queries/requests via browser 818. In alternative embodiments of the present invention, localized search engine 808 may receive search queries directly from the user, e.g., via an user interface provided by localized search engine 808. Upon receiving a user query, localized search engine 808 may search index information 802 to identify relevant virtual user groups which satisfy the user search query. Information identifying the relevant virtual user groups may be provided to the user via browser 818.

According to an embodiment of the present invention, localized search engine 808 may also track and/or mine information contained in the search queries provided by the user. The option to mine user query information is user-configurable. The information mined by localized search engine 808 may be used to build or augment user profile information 804 which may be stored in the storage subsystem of user system 102.

According to an embodiment of the present invention, automated virtual user group selector module 810 is configured to automatically identify virtual user groups of interest to the user based upon user profile information 810 and index information 802. Information related to the virtual user groups identified by automated document selector module 810 to be of interest to the user may be provided to the user via browser 818. According to an embodiment of the present invention, information related to virtual user groups automatically identified by automated document selector module 810 to be of interest to the user is forwarded to membership processor 812 for further processing.

Membership processor module 812 is configured to handle operations related to joining virtual user groups. The user may manually identify the virtual user groups which the user wants to join using browser 818. Information identifying the virtual user groups selected by the user is received by membership processor module 812 via browser 818 and is stored by membership module 812 in membership information 806. Membership processor module 812 may also receive information related to virtual user groups automatically identified by automated virtual user group selector module 810. This information is also stored in membership information 806. Membership module 812 determines the VUGHSSs 116 hosting the virtual user groups listed in membership information 806 and sends a message to the VUGHSSs 116 instructing the VUGHSSs 116 to send information related to all virtual user groups (even virtual user groups which the user has not joined) hosted by VUGHSSs 116 to the user system.

Content analysis module 814 is configured to determine information which is related to virtual user groups joined by the user, and to present the relevant information to the user. Content analysis module 814 is configured to receive virtual user groups related information received by a VUGHSS 116, to determine virtual user groups which the user has joined based on information stored in membership information 806, and to extract information related to virtual user groups joined by the user from the information received from VUGHSS 116. The extracted information may be presented to the user via browser 818. Content analysis module 814 is also configured to receive content information broadcast by VUGHSSs 116, and to determine if the content information is related to at least one virtual user group which the user has joined. If content analysis module 814 determines that the content information is related to at least one virtual user group of which the user is a member, the content information is output to the user. for example, via browser 818.

According to an embodiment of the present invention, content analysis module 814 is also configured to facilitate sharing of content information accessed or viewed by the user with other members of a virtual user group. Content analysis module 814 is configured to receive content information identified to be shared with members of a virtual user group. As described above, the content information may be manually identified by the user or may be automatically identified by content analysis module 814. In order to automatically identify the content information, content analysis module 814 is configured to monitor documents (e.g., web pages) and other content information sources accessed by the user (e.g., via browser 818). Content analysis module 814 is configured to determine if the content information accessed by the user relates to a virtual user group of which the user is a member, and if it is so determined, the content information is selected to be shared with other members of the virtual user group to which the content information is related. The selected content information is then forwarded by content analysis module 814 to communication module 816 for communication to the appropriate VUGHSSs 116 (as described above in conjunction with FIG. 7).

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of communicating content information related to one or more virtual user groups from a first user system, the method comprising:

storing first information on the first user system, the first information identifying a set of one or more virtual user groups subscribed to by a user of the first user system, the set of virtual user groups including a first virtual user group;

Automatically identifying, at the first user system from content information accessed by a user using the first user system, content information that is relevant to any of the virtual user groups identified by the first information, the identified content information comprising content information that is relevant to the first virtual user group, wherein the identifying is done substantially free of any input from the user of the first user system; and communicating the identified content information that is relevant to the first virtual user group from the first user system to a server hosting the first virtual user group to enable communication of the identified content information relevant to the first virtual user group to one or more other subscribers of the first virtual user group;

wherein automatically identifying the content information at the first user system comprises;

determining, at the first user system, contents of a content source accessed using the first user system;

determining, at the first user system, a topic to which the contents of the content source are related;

determining, at the first user system, if the topic is related to the first virtual user group; and identifying, at the first user system, the contents of the content source as being relevant to the first virtual user group upon determining that the topic is related to the first virtual user group.

2. The method of claim 1 further comprising:

communicating the identified content information received by the server from the first user system from the server to a second user system, wherein the second user system stores second information identifying a set of one or more virtual user groups subscribed to by a user of the second user system;

determining, at the second user system, if the content information received from the server is relevant to a virtual user group identified by the second information; and outputting the content information received by the second user system from the server upon determining that the content information received from the server is relevant to a virtual user group identified by the second information.

3. The method of claim 1 wherein the content source is a document.

4. The method of claim 3 wherein the document is a web page.

5. The method of claim 1 further comprising:

determining, at the first user system, a plurality of servers hosting the set of virtual user groups subscribed to by the user; and determining, from the plurality of servers, the server hosting the first virtual user group.

6. The method of claim 1 further comprising:

determining, at the first user system, a plurality of servers hosting the set of virtual user groups subscribed to by the user; and communicating the content information relevant to the first virtual user group to each server in the plurality of servers.

7. A method of communicating content information from a user system, the method comprising:

at the user system:

storing information indicating that a user is a member of a plurality of virtual user groups;

identifying, from content information accessed by a user using the user system, content information relevant to a virtual user group from the plurality of virtual user groups;

determining a plurality of servers hosting the plurality of virtual user groups; and communicating the identified content information from the user system to each server in the plurality of servers;

wherein identifying the content information at the user system comprises:

determining contents of a content source accessed at the user system;

determining a topic to which the contents of the content source are related;

determining if the topic is related to the virtual user group; and identifying the contents of the content source as being relevant to the virtual user group upon determining that the topic is related to the virtual user group.

8. A system for communicating content information comprising:

a memory, the memory configured to store information identifying a plurality of virtual user groups; and a processor coupled to the memory, the processor configured to:

identify, from content information accessed by a user, content information relevant to a virtual user group from the plurality of virtual user groups by:

determining contents of a content source accessed by the user, determining a topic to which the contents of the content source are related, determining if the topic is related to the virtual user group, and identifying the contents of the content source as being relevant to the virtual user group upon determining that the topic is related to the virtual user group;

determine a plurality of servers hosting the plurality of virtual user groups; and communicate the identified content information to each server in the plurality of servers.

9. A system for communicating information, the system comprising:

a memory configured to store membership information, the membership information identifying a set of one or more virtual user groups subscribed to by a user, the set of virtual user groups including a first virtual user group;

a processor coupled to the memory, the processor configured to:

automatically identify, from content information accessed by a user, content information that is relevant to any of the virtual user groups identified by the membership information, the identified content information comprising content information that is relevant to the first virtual user group, wherein the identifying is done substantially free of any input from the user; and communicate the identified content information that is relevant to the first virtual user group to a server hosting the first virtual user group to enable communication of the identified content information relevant to the first virtual user group to one or more other subscribers of the first virtual user group;

wherein the processor is configured to automatically identify the content information by determining contents of a content source accessed by the user, determining a tonic to which the contents of the content source are related, determining if the topic is related to the first virtual user group, and identifying the contents of the content source as being relevant to the first virtual user group upon determining that the topic is related to the first virtual user group.

10. The system of claim 9 wherein the content source is a document.

11. The system of claim 10 wherein the document is a web page.

12. The system of claim 9 wherein the processor is further configured to:
   determine a plurality of servers hosting the set of virtual user groups subscribed to by the user; and
   determine, from the plurality of servers, the server hosting the first virtual user group.

13. The system of claim 9 wherein the processor is further configured to:
   determine a plurality of servers hosting the set of virtual user groups subscribed to by the user; and
   communicate the content information relevant to the first virtual user group to each server in the plurality of servers.

14. A computer-readable medium storing a plurality of instructions for controlling a user system to communicate content information, the plurality of instructions comprising:
   instructions that cause the user system to automatically identify, from content information accessed by a user using the user system, content information that is relevant to one or more virtual user groups subscribed to by a user of the user system, the identified content information comprising content information that is relevant to a first virtual user group subscribed to by the user, wherein the identifying is done substantially free of any input from the user; and
   instructions that cause the user system to communicate the identified content information relevant to the first virtual user group to a server hosting the first virtual user group to enable communication of the content information relevant to the first virtual user group to one or more other subscribers of the first virtual user group;
   wherein the instructions that cause the user system to automatically identify, from content information accessed by a user using the user system, comprise:
   instructions that cause the user system to determine contents of a content source;
   instructions that cause the user system to determine a tonic to which the contents of the content source are related;
   instructions that cause the user system to determine if the topic is related to the first virtual user group; and
   instructions that cause the user system to identify the contents of the content source as being relevant to the first virtual user group upon determining that the topic is related to the first virtual user group.

15. The computer-readable medium of claim 14 wherein the plurality of instructions further comprises:
   instructions that cause the user system to determine a plurality of servers hosting the set of virtual user groups subscribed to by the user; and
   instructions that cause the user system to determine, from the plurality of servers, the server hosting the first virtual user group.

16. The computer-readable medium of claim 14 wherein the plurality of instructions further comprises:
   instructions that cause the user system to determine a plurality of servers hosting the set of virtual user groups subscribed to by the user; and
   instructions that cause the user system to communicate the content information relevant to the first virtual user group to each server in the plurality of servers.

17. A computer-readable medium storing a plurality of instructions for controlling a user system to communicate content information, the plurality of instructions comprising:
   instructions that cause the user system to identify, from content information accessed by a user using the user system, content information relevant to a virtual user group from a plurality of virtual user groups subscribed to by a user of the user system;
   instructions that cause the user system to determine a plurality of servers hosting the plurality of virtual user groups; and
   instructions that cause the user system to communicate the identified content information from the user system to each server in the plurality of servers;
   wherein the instructions that cause the user system to identify, from content information accessed by a user using the user system, comprise:
   instructions that cause the user system to determine contents of a content source;
   instructions that cause the user system to determine a topic to which the contents of the content source are related;
   instructions that cause the user system to determine if the topic is related to the virtual user group; and
   instructions that cause the user system to identify the contents of the content source as being relevant to the virtual user group upon determining that the topic is related to the virtual user group.

18. A computer-readable medium storing a plurality of instructions for controlling a user system to communicate content information, the plurality of instructions comprising:
   instructions that cause the user system to identify, from content information accessed by a user using the user system, content information relevant to a virtual user group from a plurality of virtual user groups subscribed to by a user of the user system;
   instructions that cause the user system to determine a plurality of servers hosting the plurality of virtual user groups; and
   instructions that cause the user system to communicate the identified content information from the user system to each server in the plurality of servers without revealing user-related information to the plurality of servers thereby preserving the user's privacy;
   wherein the instructions that cause the user system to automatically identify, from content information accessed by a user using the user system, comprise:
   instructions that cause the user system to determine contents of a content source;
   instructions that cause the user system to determine a topic to which the contents of the content source are related;
   instructions that cause the user system to determine if the topic is related to the virtual user group; and
   instructions that cause the user system to identify the contents of the content source as being relevant to first virtual user group upon determining that the topic is related to the virtual user group.

19. A method of communicating content information related to one or more virtual user groups from a first user system, the method comprising:

storing first information on the first user system, the first information identifying a set of one or more virtual user groups subscribed to by a user of the first user system, the set of virtual user groups including a first virtual user group;

automatically identifying, at the first user system from content information accessed by a user using the first user system, content information that is relevant to any of the virtual user groups identified by the first information, the identified content information comprising contents of a content source accessed using the first user system that is relevant to the first virtual user group, wherein the identifying is done substantially free of any input from the user of the first user system; and communicating the identified content information that is relevant to the first virtual user group from the first user system to a server hosting the first virtual user group to enable communication of the identified content information relevant to the first virtual user group that is located on the first user system to one or more other subscribers of the first virtual user group;

wherein identifying the content information at the first user system comprises:

determining, at the first user system, a topic to which the contents of the content source are related;

determining, at the first user system, if the topic is related to the first virtual user group; and identifying, at the first user system, the contents of the content source as being relevant to the first virtual user group upon determining that the topic is related to the first virtual user group.

* * * * *